J. HOLSWORTH.
TRAP.
APPLICATION FILED SEPT. 4, 1915.

1,265,659.

Patented May 7, 1918.

Witnesses
John D. Spalding
John J. McCarty

Inventor
John Holsworth
By Victor J. Evans
Attorney

UNITED STATES PATENT OFFICE.

JOHN HOLSWORTH, OF EVARTS, ALBERTA, CANADA.

TRAP.

1,265,659.

Specification of Letters Patent.

Patented May 7, 1918.

Application filed September 4, 1915. Serial No. 49,127.

*To all whom it may concern:*

Be it known that I, JOHN HOLSWORTH, a citizen of the United States of America, residing at Evarts, in the Province of Alberta and Dominion of Canada, have invented new and useful Improvements in Traps, of which the following is a specification.

This invention relates to certain novel and useful improvements in traps and has particular application to a trap that is designed to catch animals that burrow into the earth.

In carrying out the present invention, it is my purpose to provide a trap of the class described which may be placed at the open end of the hole or opening in the earth that the animal occupies so that the animal may be trapped when attempting to leave the hole.

It is also my purpose to improve and simplify the general construction of traps of the class described and to provide a trap which will operate efficiently and effectively for its intended purpose and wherein the component parts will be so arranged and correlated as to reduce the possibility of derangement to a minimum.

With the above and other objects in view, the invention consists in the construction, combination and arrangement of parts hereinafter set forth, in and falling within the scope of the claim.

In the accompanying drawing:—

Figure 1:
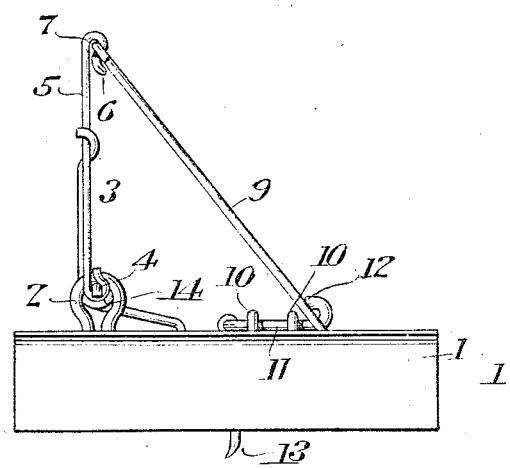
Figure 1 is a view in side elevation of a trap constructed in accordance with the present invention, the same being shown in closed position.
Figure 2:
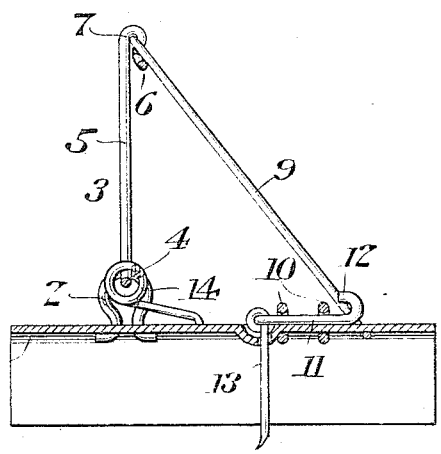
Fig. 2 is a longitudinal sectional view through the trap.
Figure 3:
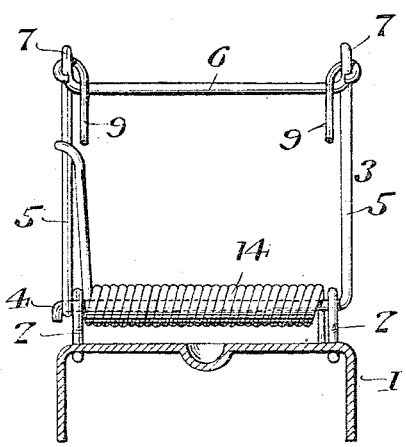
Fig. 3 is a cross sectional view showing the parts in closed position.
Figure 4:
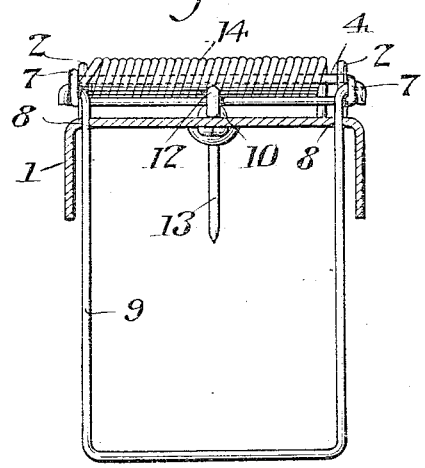
Fig. 4 is a view similar to Fig. 3 showing the trap as set.

Referring now to the drawing in detail, 1 designates a base constructed of any suitable material and formed, adjacent to one end, with ears 2 spaced apart across the base. 3 designates an actuator formed of a single length of wire bent to provide a shaft portion 4 rotatably mounted within the ears 2, outwardly projecting arms 5 arranged at right angles to the shaft portion 4 and parallel with each other, and a central interconnecting portion 6. At the junctures of the interconnecting portion with the arms 5, eyes 7 are formed. Formed in the base 1 adjacent to the other end thereof are openings 8 spaced apart a distance corresponding to the space between the ears 2. 9 designates a substantially U-shaped jaw having the legs thereof passed through the openings 8 and the extremities of such legs secured within the eyes 7, while the central portion of the jaw is disposed below the plate.

Suitably secured to the upper surface of the base 1 between the openings 8 and spaced apart a short distance longitudinally of the plate are ears 10 and slidably mounted within the ears 10 is a setting rod 11 having one end bent upon itself to form a hook 12 and the remaining end connected with the upper extremity of an actuating pin 13 projecting through an opening in the base plate and supported therein for rocking movement by said rod. Surrounding the shaft portion 4 of the actuator is a spring 14 having one end secured to the base and the remaining end secured to one of the arms 5, such spring acting normally to draw the central portion of the jaw toward the base plate. The extremity of the actuating pin 13 disposed above the base is looped or coiled about the adjacent extremity of the setting rod 11 and is swingingly associated therewith. As above stated, the setting rod 11 is adapted to slide toward and away from the central interconnecting portion 6 of the actuator 3. It is essential that the setting rod move in a true horizontal plane, to prevent any binding between the hook terminal 12 thereof and the interconnecting portion 6 of the actuator 3 when effecting a release of the latter, so as to provide a device of the class in question which is both sensitive and positive in operation. The base 1 is utilized as a support for the setting rod 11, and to permit the setting rod to properly engage the base 1, the base is provided with a depression 11' to accommodate the looped extremity of the actuating pin 13.

In the use of the trap, the actuator is pushed downwardly against the action of the spring 14, thereby lowering the jaw 9. When the central portion 6 of the actuator registers with the hooked terminal of the setting rod, the setting rod is shifted longitudinally within the ears 10 to engage the hook with the actuator, thereby holding the actuator and jaw in set position against the action of the spring 14. The trap is placed over the hole occupied by the animal. In attempting to emerge from the hole the animal passes his head through the jaw and strikes the actuating pin 13 and operates the setting rod to release the actuator, thereby permitting the spring to react to spring the trap.

I claim:

A trap of the character described comprising a base of substantially inverted U-shaped formation in cross section, spaced ears rising from the base adjacent one end, a yoke pivotally mounted between said ears for vertical swinging movement toward and away from the base, trapping mechanism associated with the yoke and operating through spaced openings in the base, a trigger for said trapping mechanism including a rod mounted upon the base for horizontal sliding movement, said rod having a hook-like terminal adapted to engage said yoke to hold said trapping mechanism normally in inactive position, a pair of spaced guides on said base embracing said rod, said base having a depression with an opening therein, and an actuating pin extending through said opening and fulcrumed upon the edge thereof and vertically disposed beneath said base, the upper extremity of said pin being coiled about the adjacent extremity of said rod and swingingly connected therewith, and said depression receiving said coil of the actuating pin, whereby said rod is permitted to wholly contact the base to insure sliding movement in a true horizontal plane.

In testimony whereof I hereby affix my signature.

JOHN HOLSWORTH.

Copies of this patent may be obtained for five cents each, by addressing the "Commissioner of Patents, Washington, D. C."